Figure 1:
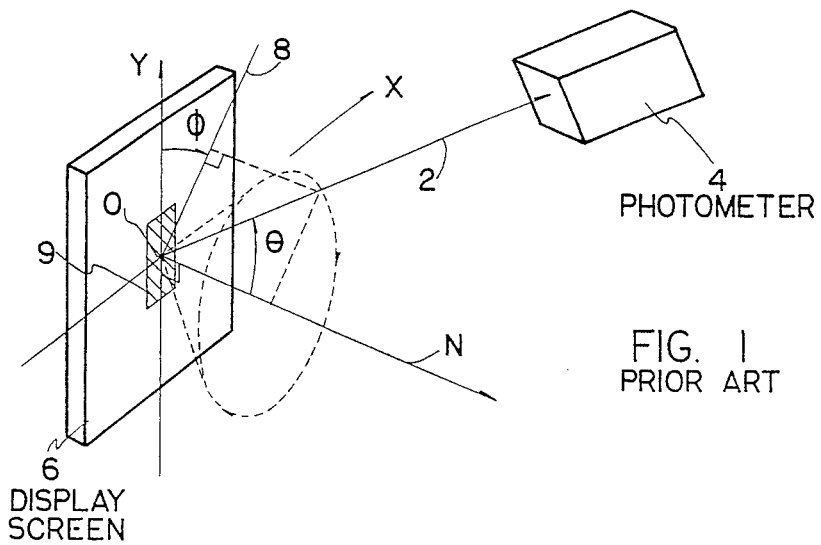

United States Patent [19]

Deutsch

[11] Patent Number: 4,870,263
[45] Date of Patent: Sep. 26, 1989

[54] DEVICE FOR DETERMINING THE CONTRAST OF A DISPLAY SCREEN AS A FUNCTION OF THE OBSERVATION DIRECTION

[75] Inventor: Jean-Claude Deutsch, Grenoble, France

[73] Assignee: Commissariat a l'Energie Atomique, Paris, France

[21] Appl. No.: 173,234

[22] Filed: Mar. 24, 1988

[30] Foreign Application Priority Data

Apr. 8, 1987 [FR] France .................. 87 04944

[51] Int. Cl.⁴ .................................. G01J 1/36
[52] U.S. Cl. ..................... 250/201; 250/204
[58] Field of Search ......... 250/234, 225, 578, 201 PF, 250/201 R, 204; 350/330, 331 R; 354/406, 407, 408

[56] References Cited

U.S. PATENT DOCUMENTS 3,750,136  7/1973  Roess .................. 350/331 R

OTHER PUBLICATIONS

Barna; Review of Scientific Instruments; vol. 47, No. 10; Apparatus for Optical Characterization of Displays; Oct. 1976; pp. 1258-1260.
Japanese Patent Abstracts, vol. 7, No. 130, JP-A-58 47226 (Cannon KK); Mar. 1983.
Japanese Patent Abstracts, vol. 7, No. 278 JP-A-58-155328 (Daini Seisokosha), Sep. 1983.
Japanese Patent Abstracts, vol. 7, No. 23 JP-A-57-175937 (Hitachi Seisakusko), Apr. 1981.
Japanese Patent Abstracts, vol. 5, No. 191, JP-A-56-117106 (Dainippon Insatsu KK), Feb. 1980.

*Primary Examiner*—David C. Nelms
*Assistant Examiner*—Eric F. Chatmon
*Attorney, Agent, or Firm*—Pearne, Gordon, McCoy & Granger

[57] ABSTRACT

A device for determining the contrast of a display screen as a function of the observation direction. This device comprises a first convergent objective (12) for forming the image (19) of the Fourier transform of an elementary surface (9) of a screen (6) in the image focal plane (Fi) of the first objective, a second convergent objective (14) for projecting the image of the transform on to an array (16) of detectors (18) arranged in matrix-like manner, each detector producing an electric signal proportional to the light intensity from the elementary surface in accordance with a given observation direction and a diaphragm (20) in the vicinity of the second objective and whose aperture defines a surface, which must be equal to that of the elementary surface, as well as a computer for processing the electric signal produced by each detector in order to determine said contrast.

3 Claims, 7 Drawing Sheets

DEVICE FOR DETERMINING THE CONTRAST OF A DISPLAY SCREEN AS A FUNCTION OF THE OBSERVATION DIRECTION

DESCRIPTION

The present invention relates to a device for determining the contrast of a display screen with a view to more particularly plotting isocontrast curves, i.e. curves of the same contrast, of the display screen in accordance with the screen observation direction.

The display screen can be a screen with alphanumeric characters or a matrix screen, using as the display material a liquid crystal film, an electroluminescent material, an electrochromic material or an ionizable gas. However, the invention more particularly applies to liquid crystal display screens.

The production of complex images with the aid of matrix display screens places severe quality requirements on the visibility. Among the main factors influencing the visibility, the contrast, as a function of the screen observation direction, is one of the most important.

In particular, in the case of flat liquid crystal display screens, no matter what their operating modes and the nature of the liquid crystal, the contrast varies rapidly as a function of the observation direction of the screen, due to the fact that the physical phenomena involved in creating an image are linked with the optical anisotropy of the molecules of the liquid crystal contained in the screen.

Furthermore, the contrast varies as a function of the liquid crystal used, the thickness of the liquid crystal film, the manner of illuminating the display screen and the nature of the polarizers, when the latter are necessary for display purposes.

The contrast of a display screen as a function of its observation direction and in particular the isocontrast curves of said screen demonstrate the optical qualities of the screen. This enables the designers of display screens to test them at different stages of their manufacture, in order to modify a particular element thereof influencing the contrast with a view to improving the optical characteristics thereof. This also enables the manufacturers of complex systems using display screens (Minitel, microcomputers, text processing machines, etc.) to choose the screen with the highest performance which is commercially available.

The contrast C of a display screen is determined by measuring the ratio of the luminance of an elementary display surface in the displayed state $L_B$ or white point with respect to the luminance of said same point in the undisplayed state or black point $L_N$, i.e. $C = L_B/L_N$. Because this contrast varies as a function of the observation direction of the elementary display surface, a certain number of relatively complex systems have hitherto been developed for determining this contrast according to the screen observation direction. The contrast of the screen is generally measured with the aid of a photometer, optionally coupled with processing electronics.

FIG. 1 diagrammatically shows the principle of measuring the contrast of a display screen as a function of the observation direction thereof. The orientation of the optical axis 2 of photometer 4 with respect to the display screen 6 represents the observation direction of said screen by an observer. It is defined with the aid of two angles $\theta$ and $\Phi$. Angle $\theta$ is the angle formed by the optical axis 2 of photometer 4 with the normal N to the surface of the screen 6 to be tested and more specifically with the normal N to the surface of an elementary display point 9 of said screen. Angle $\Phi$ is the angle defined between the projection 8 of the optical axis 2 in the plane of screen 6 and a straight reference line y contained in the plane of the screen.

The determination of the contrast as a function of the values of $\theta$ and $\Phi$ can take place by using a screen 6 mobile about two rotation axes perpendicular to one another and to the optical axis 2 and a fixed photometer 4 (or conversely a fixed screen and a mobile photometer). This contrast determination method is diagrammatically illustrated in FIG. 2.

Figures 2A, 2B:
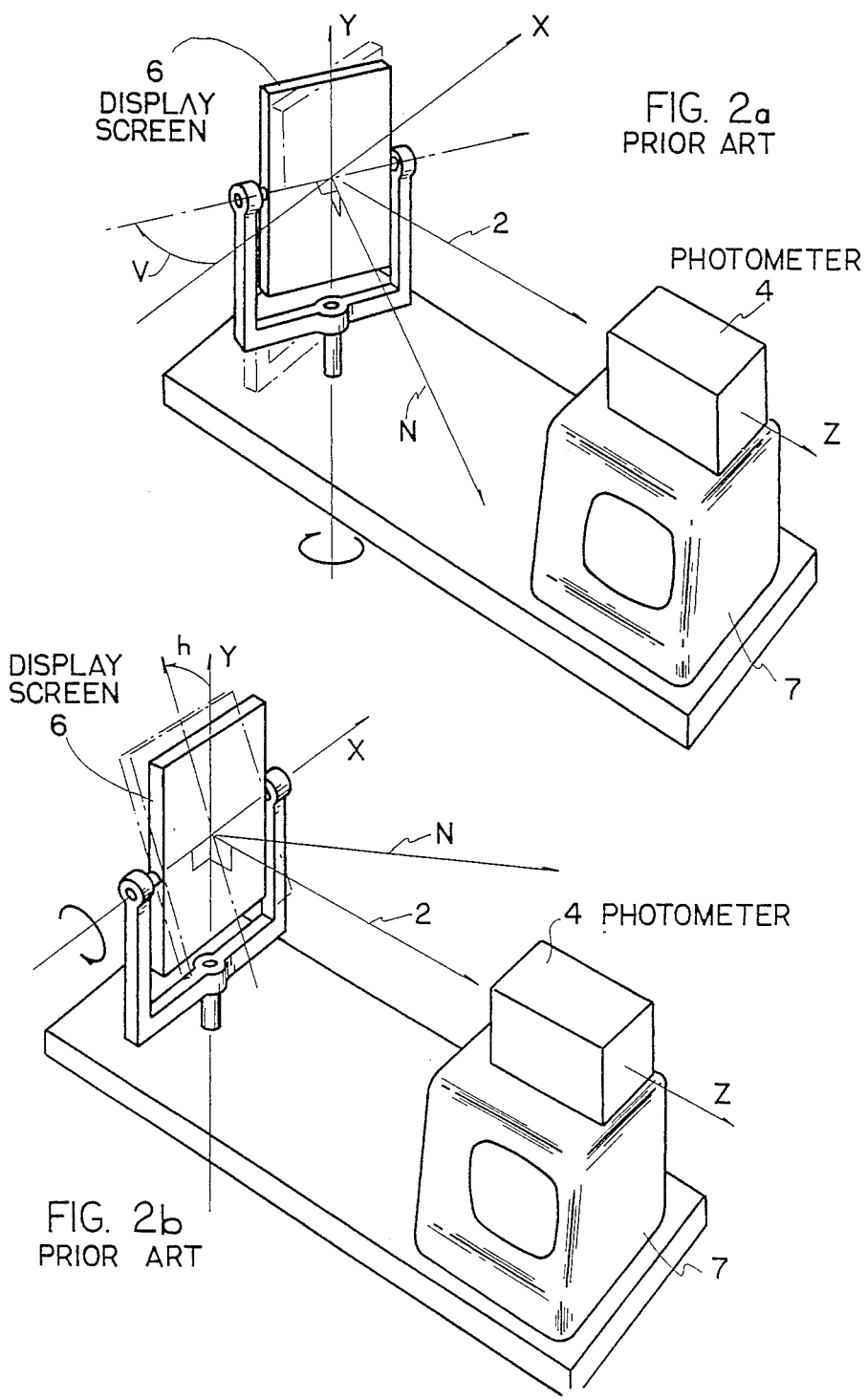

In this case, the viewing angles $\theta$ and $\Phi$ are defined by Euler angles with respect to a fixed orthonormal reference xyz, whose axis z coincides with the optical axis 2 of the photometer. Angle v defines the rotation angle of the screen 6 with respect to the direction x of the reference mark, as is shown in FIG. 2a, whilst h is the rotation angle with respect to direction y thereof as shown in FIG. 2b.

The simple relations $\sin v = \sin \theta \cos \Phi$ and $\cos h = \cos \theta / \cos v$ make it possible to determine $\theta$ and $\Phi$, knowing v and h, with the aid of a microcomputer 7 coupled to the photodetector 4.

The use of Euler angles is described in a publication by J. C. DEUTSCH, published in Visu 86, Jourées National d'Etudes, Toulon, 27 to 30 October, "Système de Mesure Automatique pour la Caractérisation d'Ecrans à Cristaux Liquides".

Figure 3:
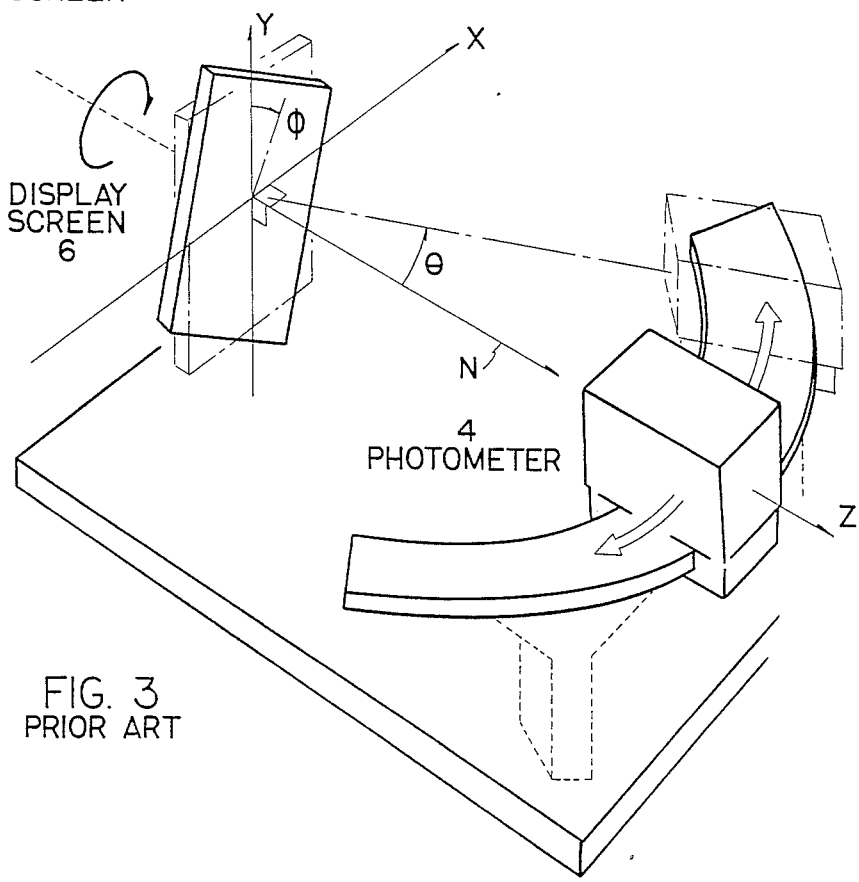

In another solution, as shown in FIG. 3, the screen 6 to be studied is mobile about axis z and the photometer 4 is mobile in a plane perpendicular to the screen and containing axis x. Angle $\Phi$ is then defined by the rotation of screen 6 and is measured relative to axis y for example and the angle $\theta$ is defined by the displacement of photometer 4 and is equal to the angle between the normal N to the elementary display surface 9 and the optical axis 2 of the photometer.

These different solutions have a certain number of disadvantages. Thus, the two rotation axes of the screen (FIGS. 2a, 2b) or respectively the screen or photometer (FIG. 3), as well as the optical axis or axis z of the reference mark xyz must be perfectly concurrent at point 0 and in particular located in the center of an elementary display surface 9 of screen 6. This causes major problems with regards to the mechanical construction of the system ensuring the rotation of the screen and/or photometer.

Moreover, whenever the screen is changed, a long and fastidious regulation is required to ensure a good positioning of said screen relative to the optical axis of the photometer, as well as a good positioning of the mechanical systems ensuring the two rotations. The correct positioning of a screen requires an at least 2 hour adjustment period.

Moreover, the realization of isocontrast curves as a function of the orientation direction of the display screen to be studied is long and fastidious and requires at least 12 working hours.

The present invention relates to a device for determining the contrast of a display screen as a function of the observation direction making it possible to obviate the disadvantages referred to hereinbefore. Thus, the device according to the invention only requires a simple regulaton of the screen and the measurement time is relatively short, namely a few minutes which are sufficient for carrying out the setting and for plotting various isocontrast curves of the screen.

More specifically, the present invention relates to a device for determining the contrast between the displayed state and the undisplayed state of an elementary surface of a display screen as a function of the observation direction of said point, characterized in that it comprises:

a first convergent objective used for forming the Fourier transform image of the elementary surface in the focal image plane of the first objective, a second convergent objective for projecting the image of the transform on to an array of detectors arranged in matrix form, each detector producing an electric signal proportional to the light intensity supplied by the elementary surface in a given observation direction, a diaphragm located in the vicinity of the second objective, whose aperture defines a surface which must be equal to the elementary surface and means for processing the electric signal produced by each detector in order to determine said contrast.

The elementary display surface can be larger, smaller or equal to a picture element (pixel) of the display screen.

Apart from its aforementioned advantages, the device according to the invention is relatively simple and inexpensive.

Advantageously, the device comprises storage means and display means, in order to realize and display isocontrast curves of the screen to be studied. In order to simplify the processing of the electric signals from the matrix detector, the screen to be studied is advantageously placed in the object focal plane of the first objective.

Other features and advantages of the invention can be gathered from the following non-limitative and illustrative description with reference to the attached drawings, wherein show:

FIG. 1 Already described, the measuring principle of the contrast of a display screen as a function of the observation direction thereof.

FIGS. 2a and 2b Already described, diagrammatically a first method of measuring the contrast of a display screen as a function of the observation direction thereof.

FIG. 3 Already described, diagrammatically a second method for measuring the contrast of a display screen as a function of the observation direction thereof.

Figure 4:
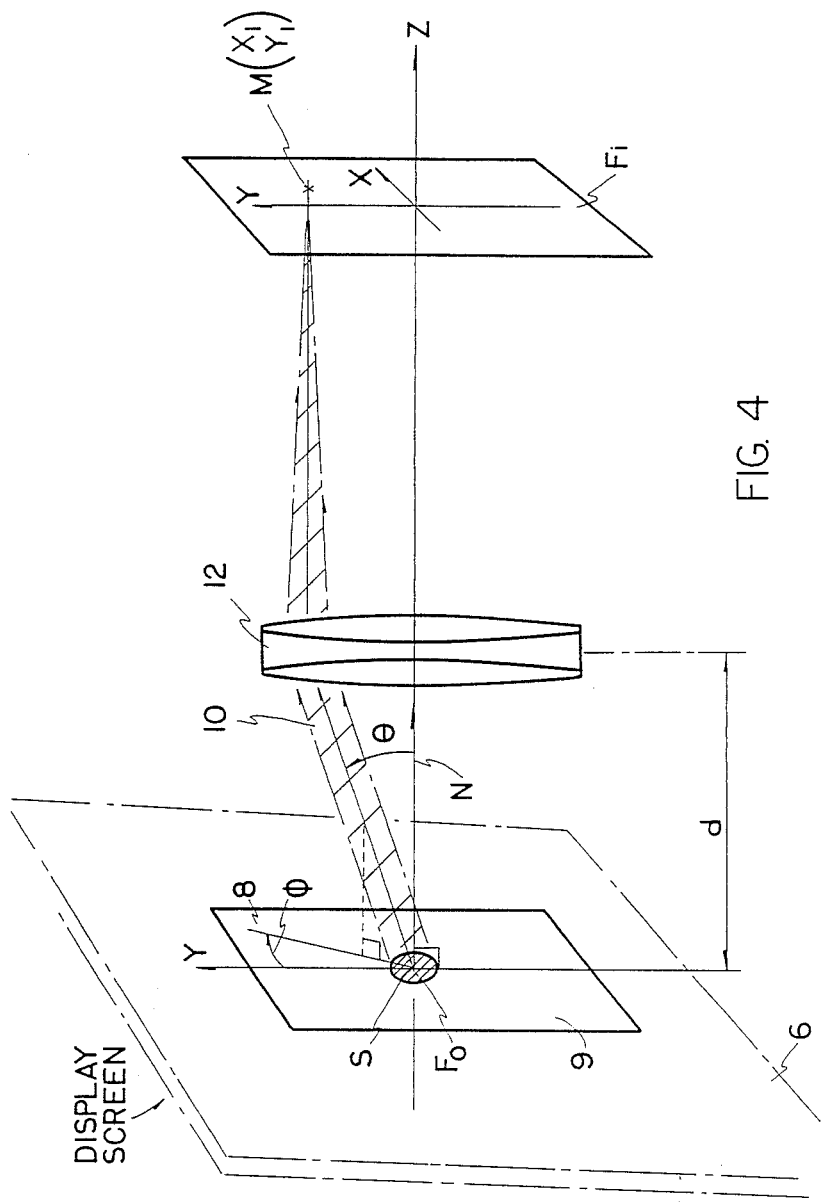

FIG. 4 The physical principle used in the device according to the invention.

Figure 5:
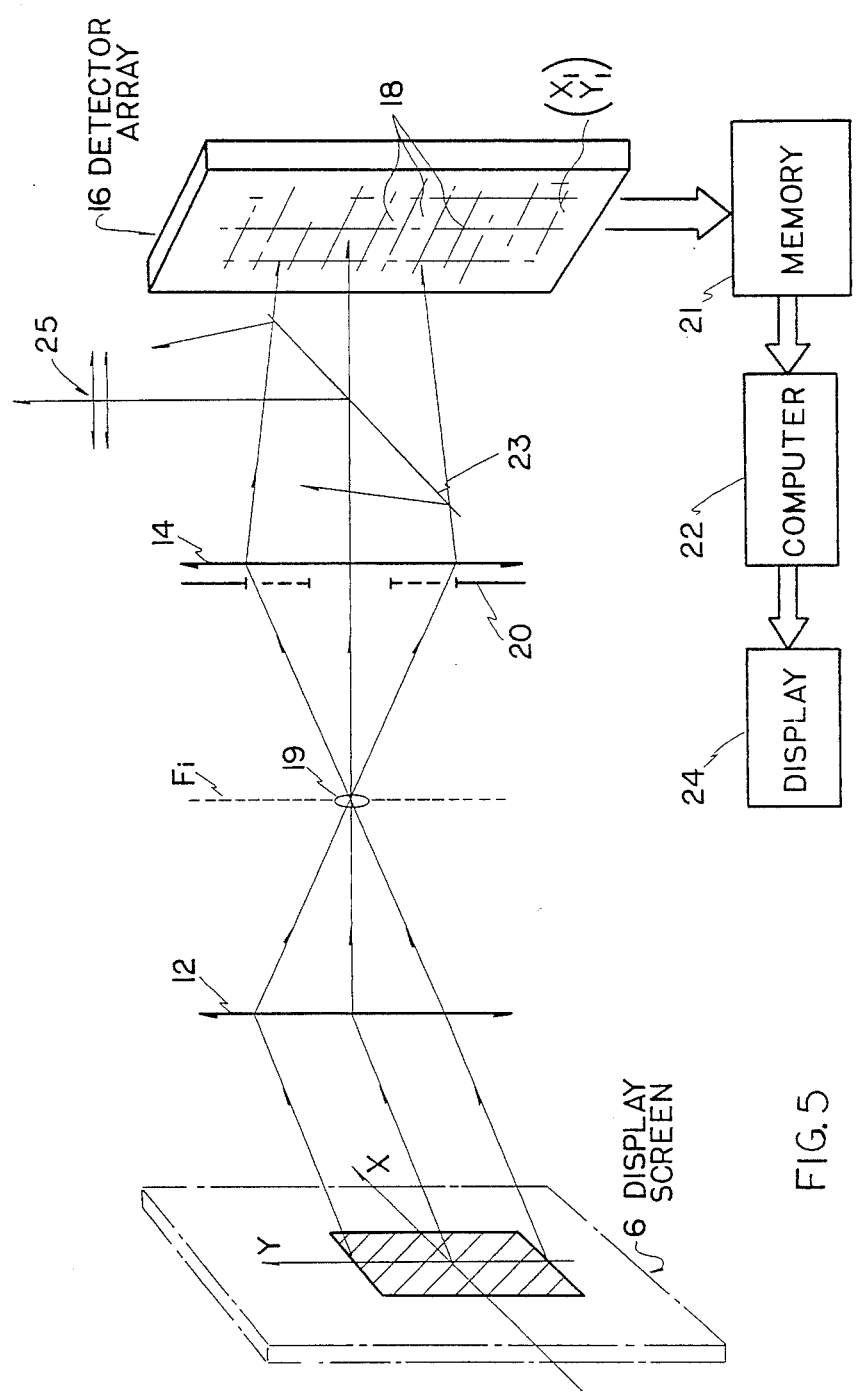

FIG. 5 Diagrammatically the device according to the invention.

FIGS. 6, 7 and 8 The cartography of the contrast of three different screens as a function of the observation direction thereof.

FIG. 4 represents the optical principle used in the device according to the invention. It shows a display screen 6 to be studied located at the object focus Fo of an objective 12. The elementary display surface 9 of screen 6, e.g. in the displayed state diffuses light in all directions in space and in particular over the entire objective 12.

An elementary light beam 10 traversing a surface element S contained in surface 9 forms an angle $\theta$ with respect to the screen normal N, and its projection 8 in the plane of screen 6 forms with the vertical direction y, perpendicular to the optical axis z of the device, an angle $\Phi$. This elementary beam, which is inclined with respect to the screen, is a parallel light beam, i.e. all the rays forming it are parallel to one another and all the light energy of said beam, whose section is equal to S, is concentrated at a point $M_1$ of coordinates $x_1$, $y_1$, located in the image focal plane Fi of objective 12.

Thus, there is a biunivocal relationship between the angular direction defined by angles $\theta$ and $\Phi$ of an elementary light beam traversing objective 12 and the coordinates of a point M of the image focal plane Fi of said objective 12.

For a display screen 6 at the object focus $F_o$ of objective 12, the following geometrical relationships exist for each point Mi of coordinates xi and yi of the image focal plane Fi:

$$xi = \sin \theta \cos \Phi \quad (1)$$

$$yi = \sin \theta \sin \Phi \quad (2)$$

According to the invention, it is possible to place the screen 6 to be studied upstream of the object focus Fo of objective 12. In this case, relations (1) and (2) between the coordinates of a point Mi of the image focal plane of objective 12 and angles $\theta$ and $\Phi$ must be multiplied by a constant k, which is a function of the distance d separating screen 6 and objective 12, as well as optical aberrations which can intervene as a result of the arrangement of the different optical elements and the quality of said elements.

The corrective term to be made can be obtained by carrying out a prior calibration of the optical system consisting of determining the exact position of different points Mi of the image focal plane Fi as a function of clearly defined observation directions and therefore of the well known values $\theta$ and $\Phi$.

FIG. 5 shows the device according to the invention using the principle shown in FIG. 4. This device has a first objective 12, constituted by several convergent lenses, whose focal distance varies from 10 to 50 mm, positioned facing the screen 6 to be studied. The distance separating objective 12 and screen 6 is equal to the object focal distance of objective 12.

All the light passing through the elementary display surface 9 of screen 6 converges in the image focal plane Fi of objective 12. Image 19 of the Fourier transform of the elementary surface 9 formed at Fi is in the form of a small diameter light spot.

The notion of the image of the Fourier transform of an object is well known in the art. For further details on said transform, reference can be made to Optique Instrumentale, vol. II, "Diffraction et Structure des Images", by André Maréchal and Maurice Francon, Revue d'Optique Théorique et Instrumental, Paris 1960, or to the book entitled Optics by Born and Wolf. Image 19 is projected with the aid of a second objective 14, constituted by several convergent lenses, having a focal line from 10 to 50 mm on to an array 16 of detectors 18 distributed in matrix form.

According to the invention, the first objective 12 is used for forming the image of surface S (see FIG. 4) on the second objective 14 and for forming in its focal plane Fi, the image Mi of a point at infinity representing the orientation of a "parallel" light beam 10 (see FIG. 4) traversing the analysis surface 9 of screen 6. The second objective 14 then projecs the image Mi of the point at infinity to a detector 18.

The detector array 16 can be a matrix photoelectric detector of the charge coupled device type, a reticon, a television tube, etc., as is known in the art. Each elementary detector 18, which can be designated by coordinates Xi and Yi, detects the light intensity passing through the elementary display surface 9 in a clearly defined direction, i.e. corresponding to clearly defined values of $\theta$ and $\Phi$.

In order to measure the light energy coming only from the elementary display surface 9 of the screen, a regulatable aperture diaphragm 20 is fixed to the second objective 14, either to the side of the objective 12 as shown, or to the other side. The aperture of the diaphragm 20 serves as a field diaphragm for display screen 6, i.e. the aperture of diaphragm 20 fixes the dimensions of the surface element 9 of screen 6 which is being studied. In other words, the aperture of diaphragm 20 defines a surface equal to the elementary display surface 9.

At present, the picture elements (pixels) have a surface of approximately $0.3 \times 0.3$ mm$^2$ and the device according to the invention can be used for analyzing a surface 9 between $0.1 \times 0.1$ mm$^2$ and $1 \times 1$ mm$^2$.

The regulation of the device according to the invention can be carried out by an auxiliary system having a semireflecting mirror 23 between objective 14 and the detector array 16 transmitting part of the light from display surface 9 in the direction of a known sighting system 25.

The electric signal supplied by each detector 18 is proportional to the light intensity of the elementary display surface 9 in accordance with a given orientation. It is received in a memory 21 connected to a microcomputer 22, which transforms each electric signal, supplied by the different elementary detectors 18, into luminance and associates said luminance value with clearly defined values of $\theta$ and $\Phi$ determined by computer 22, as a result of the marking at X and Y of the different elementary detectors using the aforementioned equations (1) and (2).

The measurement of the luminance for the different observation directions of the display surface 9 is carried out simultaneously. This luminance is firstly determined when the elementary display surface 9 is in the displayed state or white point, followed by when said elementary display surface is in the undisplayed state or black point. The relationship of the luminance of the white point to the luminance of the black point, corresponding to the display screen contrast, as a function of a specific observation direction defined by angles $\theta$ and $\Phi$, is calculated by microcomputer 22.

In order to take account of the optical aberrations of the system overall, a prior calibration can be carried out and stored in the microcomputer, so as to allocate to each detector a clearly defined display screen observation direction.

In order to plot the different isocontrast curves of the display surface 9 of screen 6, computer 22 can control a display means 24, which can be the actual display screen of microcomputer 22, when the latter has one, or can be a plotting table XY.

Electronic processing making it possible to associate with each detector 18 marked in X and Y a screen contrast value is simple and routine in the art.

The device according to the invention made it possible to plot isocontrast curves of different types of screen, all the isocontrast curves of a given screen being called cartography.

FIG. 6 relates to a poor quality screen, FIG. 7 to an average quality screen and FIG. 8 to a good quality screen, these three cartographies are carried out in the xy plane.

Curve A shown in FIG. 6 represents the location of the points where the contrast is equal to 1.6. This curve is relatively offcentered with respect to the origin O of the axes and the value of the contrast y is very low. Thus, it is estimated that a good quality screen must have a contrast at least equal to 3 and this, for the highest possible values of $\theta$ and $\Phi$. However, it can be gathered from FIG. 6, that the maximum contrast of said screen is equal to 1.6, the other curves respectively representing the isocontrast curves of 1.5, 1.4, 1,2 and 1.

The contrast of the screen for a given observation direction defined by angles $\theta$ and $\Phi$ can be read as follows on the different cartographies. For example, point P$_1$ on the contrast curve 1.2 corresponds to an observation orientation of the screen defined by angle $\theta$ to disance $\overline{OP}_1$ and by angle $\Phi$ formed by the straight line passing through point O and point P$_1$ with the abscissa axis x. In the present case, $\overline{OP}_1 = 3.3$ cm which, on the abscissa scale, gives an angle of 20°, whereas the angle $\Phi$ is close to 37°, measured e.g. with the protractor.

In the same way, point P$_2$ on contrast curve 1.6 corresponds to an observation orientation defined by angle $\theta$ equal to distance $\overline{OP}_2$, i.e. 3.3 cm which, plotted on the abscissa axis, gives an angle of 20°, and by the angle $\Phi$ formed by straight line OP$_2$ with direction x and which is close to +296°. The inclination angles $\theta$ are relatively small, which further increases the poor quality of the screen.

FIG. 7 relates to an average quality screen, because it has isocontrast curves between 4.5 and 1.5 and the isocontrast curves at least equal to 3 corresponds to average angle $\theta$ and $\Phi$. For example, point P$_3$ on isocontrast curve 3 corresponds to an angle $\theta$, defined by the distance $\overline{OP}_3$, i.e. 4 cm approximately, which on the ordinate curve gives an angle $\theta$ equal to −29° and to an angle $\Phi$ defined between the straight line, passing through point O and point P$_3$, and the x axis is equal to 210°.

FIG. 8 represents the cartography of contrast of a good quality screen as a function of its observation angle. Thus, point P$_4$ on the isocontrast curve 3 corresponds to an angle $\theta$, defined by the distance $\overline{OP}_4$ equal to 6 cm, i.e. 45° and to an angle $\Phi$, defined between axis x and the straight line passing through point O and point P$_4$, which is close to 315°. Moreover, the isocontrast curves at least equal to 3 are much greater and much more numerous than those shown in FIG. 7, it even proving possible to plot an isocontrast curve 8.

The three above cartographies were produced in less than 10 minutes each, which correspond to a time much shorter than that obtained with the prior art devices. Moreover, the system according to the invention is relatively simple and completely static, unlike those of the prior art.

I claim:

1. A device for determining a value of contrast between a displayed state and an undisplayed state of an elementary surface (9) of a display screen (6) according to the observation direction of a point, characterized in that it comprises:

a first convergent objective (12) used for forming a Fourier transform image (19) of the elementary surface (9) in a focal image plane Fi of the first objective (12).

a second convergent objective (14) for projecting the Fourier transform image (19) on to an array (16) of detectors (18) arranged in matrix form, each detector (18) producing an electric signal proportional to a light intensity supplied by the elementary surface (9) in a determined observation direction (O, O), a diaphragm (20) located adjacent to the second objective (14), whose aperture defines a surface which must be equal to the elementary surface and means for processing (22) the electric signal produced by each detector (18) in order to determine said value of contrast.

2. A device according to claim 1, characterized in that storage means (21) and display means (24) are provided in order to produce and display isocontrast curves (FIGS. 6 to 8) of the elementary surface (9).

3. A device according to claim 1, characterized in that the first objective (12) and display screen (6) are separated from one aother by a distance equal to the object focal distance (d) of the first objective (12).

* * * * *